Patented July 18, 1967

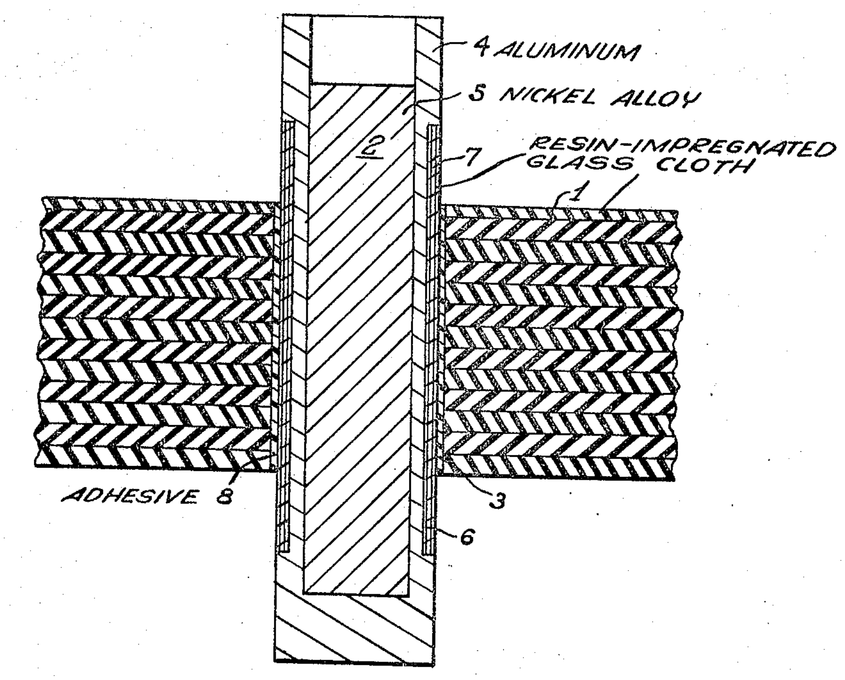
Inventor
HENRI PAUL VAYSON
By Holcombe, Wetherill & Brisebois
Attorneys United States Patent Office 3,331,919

3,331,919

ELECTRICAL LEAD-THROUGH CONNECTORS

Henri Paul Vayson, Paris, France, assignor to Societe Generale de Constructions Electriques et Mecaniques (Alsthom), Paris, France, a French body corporate Filed Oct. 15, 1965, Ser. No. 496,640
Claims priority, application France, Oct. 15, 1964, 2,555, Patent 1,419,779
5 Claims. (Cl. 174—152)

The very great increase in the conductivity of pure aluminium at a temperature of −250° C. (23° K.) with respect to its conductivity at normal temperatures, renders the use of this metal of great significance for the construction of high power electrical equipment operating at temperatures lower than −200° C., in a cryogenic medium, in particular in liquid hydrogen. The increased gain in conductivity which would result from the use of temperatures which are still lower than those of liquid hydrogen, by using liquid helium, would not economically justify the resulting increase in cost.

For such cryogenic equipment it is necessary to produce lead-through electric connectors formed from aluminium, to pass through the wall of a casing or compartment enclosing the liquified gas, where the electrical apparatus is located—for example a transformer—and an adjacent compartment which is not itself subjected to cooling or refrigeration or is subjected only to a weaker cooling allowing the connector to pass out into the ambient air. These connectors must be positively sealed to the wall, despite any movements caused by contractions and expansions due to variations in temperature to which the assembly is subjected during the cooling and heating cycles which the equipment operating in the compartment enclosing the cryogenic medium undergoes.

The walls separating the cryogenic medium from the noncryogenic media, i.e. the walls defining the compartment enclosing the cryogenic medium, are advantageously made from a laminated or layered insulating material, with a base of glass cloth and synthetic resin. In fact, it is known that below about −80° C. to −100° C., the thermoplastics materials used at present become too fragile, and experience has shown that a laminated material of glass cloth impregnated by a suitable thermo-setting resin, of the polyester or epoxy type, is robust, is easy to machine, resistive to cold which render it of particular significance for this work.

The electrical conductors are thus located in apertures made in the laminated wall of the compartment enclosing the cryogenic medium.

It is known that epoxy resins have a good adherence to metals and in particular to aluminium. Satisfactory joints may thus be produced by direct adhesion, for the normal variations of temperature. However, for a cryogenic enclosure, this arrangement is not satisfactory, because the variation in temperature, which is very considerable, between the two faces of the laminated wall exerts permanent stresses on the joint, these stresses being further aggravated by the difference of the coefficients of expansion of the aluminium and of the laminated material constituting the wall and which cannot be withstood by joints produced in this manner.

The present invention has for an object an electrical lead-through connector for such a wall made up of laminated insulating material, and defining a compartment subjected to very low temperatures, lower than −200° C., which connector remains positively sealed in spite of the thermal stresses exerted thereon.

In brief, according to a characteristic of the invention, a connector, comprising a metal conductor inserted into an aperture in the wall, is fixed in a sealed manner in said aperture by means of a collar made of laminated insulating material, adhered by its internal face to the metal conductor and by its external face to the edges of the aperture made in the wall.

It is particularly advantageous, when the laminated insulating material constituting the wall is formed by a glass cloth impregnated by a polyester or epoxy resin, to form the collar by winding around the metal conductor a strip of glass cloth impregnated by synthetic resin, preferably an epoxy resin.

Any play due to thermal effects between the aluminium connector and the edges of the aperture made in the wall is reduced by making the core of the connector of a metal alloy having a low coefficient of thermal expansion, such as a nickel alloy known as nickel 36 or the alloy known as Monel Metal 400. The external enclosure of the connector is made of aluminium, this enabling welding to be effected at the two ends of the connector and gives a good contact with the adhesive epoxy resins.

The collar enables a direct adhesion between the aluminium surface of the connector and the laminated material constituting the wall to be replaced by two adherent assemblies; one between the connector and collar which will be effected in conditions which are totally independent of the rest of the equipment, i.e. in the optimum conditions of temperature and duration of polymerisation for the resin used, in order to obtain the best adherence between the aluminium and the collar—and the other between the collar and the laminated material constituting the wall which is necessarily effected in situ, the compartment being already set up, but where adhesion is effected between two similar materials and not dissimilar ones as in the previous arrangements.

The choice of the epoxy resins which is preferred to the others, is dictated by different considerations: the absence of solvent to be eliminated which would provide bubbles, the very good adherence of these resins to aluminium, their small shrinkage after hardening, this shrinkage causing internal stresses which weaken the adhesion.

In order that the invention may be more clearly understood, reference will now be made to the accompanying drawing which shows a vertical cross section through one embodiment of lead-through connector according thereto, by way of example.

Referring to the drawing, a wall 1 of a casing or compartment enclosing a cryogenic medium is constituted by a laminated insulating material composed of glass cloth and epoxy resin, its thickness being 24 millimetres for example. A cylindrical conductor 2 is required to pass through this wall 1 through a cylindrical aperture 3 whose diameter is 14 millimetres for example. This conductor 2 is composed of an external sleeve 4 made of cast aluminium and having a central cavity in which a central core 5, made of an alloy having a low coefficient of thermal expansion such as that known as Monel Metal 400, has been driven.

A throat 6 is made in the sleeve 4 of the conductor 2, said throat having a depth of about 1 millimetre and a length at least equal to the thickness of the wall 1. The throat is laved at about 70° C. for 5 minutes with a mixture having the following composition:

| | Parts by weight |
|---|---|
| Potassium dichromate | 2 |
| Solution of 96% concentrated sulphuric acid | 7 |
| Water | 17 |

After rinsing and wiping, a strip of glass cloth impregnated with epoxy resin is wound around the throat 6 and the assembly is heat-polymerised, in order to obtain a collar 7 adhered to the aluminium enclosure 4 by the impregnating epoxy resin which has exuded.

The glass cloth used is preferably cloth having a weight of 200 g./m.$^2$ and the epoxy resin is constituted by 100 parts by weight of Epon 828 resin of the Shell Company and 29 parts by weight of the polyamine sold by the Shell Company under the name of Agent Z. Polymerisation is effected at 100° C. for 5 hours and firing at 120° C. for 10 hours.

The collar 7 is then machined, to a tolerance of 1/100 millimetre, to have a diameter of 5/100 millimetre less than that of the aperture 3 in the wall 1.

The collar 7 is then coated with an adhesive layer 8 composed of:

| | Parts by weight |
|---|---|
| Epon 828 resin | 100 |
| An amine of the cycloaliphatic/series, sold under the commercial name of Synolide 960 by the Cray Valley Products Company (England) | 30 |
| DETA (diethylenetriamine) | 5 |

Then the conductor 2 and the collar 7 are inserted into the aperture 3 and left to harden for 24 hours at an ambient temperature of about 25° C.

The adherence is improved because the material of the collar 7 is of constitution similar to that of the laminated material made of glass cloth and epoxy resin constituting the wall 1. During adhesion, the fibres of the laminated material of the wall 1 are positioned in the transverse direction, and thus have less effective resistance than if they were in longitudinal direction, but the similarity of the materials to be connected permits an efficient interpenetration of the layer 8 of epoxy resin between the collar 7 and the wall 1; this would not have taken place had there been direct contact between the section of the material of the wall 1 and the aluminium enclosure 4 of the connector conductor 2. On the other hand, for the adherence between the aluminium enclosure 4 and the collar 7, the fibres of the latter are positioned longitudinally, this improving the resistance of the joint between conductor 2 and collar 7.

Experiments have been made to determine the resistance to thermal shock and effectiveness of sealing against hydrogen gas, by plunging into liquid hydrogen a cylinder made of a laminated material formed from glass cloth and epoxy resin, closed at its two ends by flat members made of a laminated material according to my co-pending patent application Ser. No. 496,263 filed Oct. 15, 1965 for "Tank Joint Seals" one of the flat members bearing a connector produced according to the above description.

Having produced a vacuum of $2 \times 10^{-6}$ millimetres of mercury by pumping, the pressure rose again in time and after 36 hours of experiment, a vacuum of $5 \times 10^{-6}$ millimetres of mercury was observed.

A dissociable-phase cryotransformer was then produced, the windings of which of very pure aluminium (30 parts per million total impurities) were bathed in liquid hydrogen. The dimensions of the tanks were: mean diameter 450 millimetres, external height 850 millimetres. The latter were provided with four connectors as described above, and four output and measuring terminals having independent cooling or refrigeration. The tanks were surrounded by high vacuum sealed enclosures provided with thermal insulation.

This cryotransformer operated for hundreds of hours without showing any hydrogen losses.

I claim:

1. In combination with a wall of laminated insulating material for a cryogenic enclosure, an electrical lead-through, comprising an aluminum electrical conductor traversing an aperture in said wall, a core made of a metallic alloy having a low coefficient of thermal expansion located within said aluminum conductor, a collar composed of a strip of glass cloth impregnated by a synthetic resin, applied to said aluminum conductor, and a layer of synthetic resin located between the outer face of said collar and the periphery of said aperture.

2. A combination according to claim 1, wherein said layer of synthetic resin consists of epoxy resin.

3. A combination according to claim 2, wherein said wall and said collar are each made of glass cloth impregnated by epoxy resin.

4. A combination according to claim 1, wherein the fibres of said glass cloth forming said collar are positioned longitudinally.

5. A combination according to claim 1, wherein said glass cloth has a weight of 200 g./m.$^2$.

References Cited

UNITED STATES PATENTS

| | | | |
|---|---|---|---|
| 1,140,134 | 5/1915 | Eldred | 174—50.61 |

FOREIGN PATENTS

| | | |
|---|---|---|
| 769,452 | 3/1957 | Great Britain. |
| 176,815 | 10/1961 | Sweden. |

LARAMIE E. ASKIN, *Primary Examiner.*